(12) United States Patent
Wurm et al.

(10) Patent No.: US 7,371,482 B2
(45) Date of Patent: May 13, 2008

(54) LITHIUM TRANSITION-METAL PHOSPHATE POWDER FOR RECHARGEABLE BATTERIES

(75) Inventors: Calin Wurm, Amiens (FR); Mathieu Morcrette, Amiens (FR); Sylvain Gwizdala, Brienon sur Armancon (FR); Christian Masquelier, Amiens (FR)

(73) Assignees: Le Centre National de la Recherche Scientifique, Paris Cedex (FR); Umicore, Brussels (BE)

( * ) Notice: Subject to any disclaimer, the term of this patent is extended or adjusted under 35 U.S.C. 154(b) by 619 days.

(21) Appl. No.: 10/719,134

(22) Filed: Nov. 21, 2003

(65) Prior Publication Data

US 2004/0175614 A1    Sep. 9, 2004

Related U.S. Application Data

(63) Continuation of application No. PCT/EP02/05714, filed on May 22, 2002.

(30) Foreign Application Priority Data

May 23, 2001    (EP)    ................. 01401374

(51) Int. Cl.
    *H01M 4/58*    (2006.01)
    *C01B 25/30*    (2006.01)
(52) U.S. Cl. .............. 429/221; 429/223; 429/224; 429/231.3
(58) Field of Classification Search ............ 423/179.5, 423/306; 429/221, 223, 224, 231.3
See application file for complete search history.

(56) References Cited

U.S. PATENT DOCUMENTS

| | | |
|---|---|---|
| 5,871,866 A | 2/1999 | Barker et al. |
| 5,910,382 A | 6/1999 | Goodenough et al. |
| 6,514,640 B1 * | 2/2003 | Armand et al. .......... 429/231.1 |
| 6,632,566 B1 * | 10/2003 | Yamada et al. .......... 429/218.1 |
| 6,746,799 B2 * | 6/2004 | Yamada et al. ............. 429/221 |
| 6,749,967 B2 * | 6/2004 | Li et al. ................ 429/231.95 |

FOREIGN PATENT DOCUMENTS

| | | | |
|---|---|---|---|
| EP | 05711858 B1 | | 12/1993 |
| JP | 2001-110414 | * | 4/2001 |
| WO | 00/60680 | * | 10/2000 |

OTHER PUBLICATIONS

Patent Abstracts of Japan,Publication No. 2000-294238, "Synthesis of LiFePO4 and Manufacture of Nonaqueous Electrolyte Battery", Apr. 25, 2001.
N. Ravel, "Improved Iron Based Cathode Material", ECS Fall Meeting, Hawaii, Abs. No. 127 (1999).
A. Yamada, "Optimized LiFePO$_4$ for Lithium Battery Cathodes", Journal of Electrochemical Society, vol. 148, No. 3; pp. A224-A229 (2001).

* cited by examiner

*Primary Examiner*—Steven Bos
(74) *Attorney, Agent, or Firm*—Hutchinson Law Group PLLC (57) ABSTRACT

Methods of manufacture and use of phosphates of transition metals are described as positive electrodes for secondary lithium batteries, including a process for the production of LiMPO$_4$ with controlled size and morphology, M being Fe$_x$Co$_y$Ni$_z$Mn$_w$, where $0 \leq x \leq 1, 0 \leq y \leq 1, 0 \leq w \leq 1$, and $x+y+z+w=1$. According to an exemplary embodiment, a process is described for the manufacture of LiFePO$_4$ including the steps of providing an equimolar aqueous solution of Li$^{1+}$, Fe$^{3+}$ and PO$_4^{3-}$, evaporating water from the solution to produce a solid mixture, decomposing the solid mixture at a temperature of below 500° C. to form a pure homogeneous Li and Fe phosphate precursor, and annealing the precursor at a temperature of less than 800° C. in a reducing atmosphere to produce the LiFePO$_4$ powder. The obtained powders can have a particle size of less than 1 μm, and can provide superior electrochemical performance when mixed for an appropriate time with an electrically conductive powder.

11 Claims, 7 Drawing Sheets

LITHIUM TRANSITION-METAL PHOSPHATE POWDER FOR RECHARGEABLE BATTERIES

RELATED APPLICATIONS

This application is a continuation application under 35 U.S.C. 120 of International Application No. PCT/EP02/05714 filed May 22, 2002, which designated the United States and was published in English, and claims priority under 35 U.S.C. 119(a)-(d) and/or §365 to European Patent Application No. 01401374.2 filed May 23, 2001, the entire contents of both the International and European Applications being incorporated here by reference.

The present invention relates to the field of lithium secondary batteries and especially to positive electrode materials operating at voltages greater than 3 V vs. $Li^+/Li$. The invention concerns the use of phosphates of transition metals as positive electrodes and allows the manufacturing of the olivine $LiMPO_4$ with controlled size and morphology, M being $Fe_xCo_yNi_zMn_w$, with $0 \leq x \leq 1$, $0 \leq y \leq 1$, $0 \leq z \leq 1$, $0 \leq w \leq 1$ and $x+y+z+w=1$.

Lithium secondary batteries are now widely used in consumer electronics. They benefit from the light weight of lithium and from its strong reducing character, thus providing the highest energy density among known rechargeable battery systems. Lithium secondary batteries exist in various configurations depending on the nature of the electrode materials and of the electrolyte used. Commercialised Li-ion system use for instance $LiCoO_2$ and graphite respectively as positive and negative electrodes, with $LiPF_6$ in EC/DEC/PC as a liquid electrolyte. The operating voltage of the battery is related to the difference between thermodynamic free energies within the negative and positive electrodes. Solid oxidants are therefore required at the positive electrode, the materials of choice, up to now, being either the layered $LiMO_2$ oxides (M is Co or Ni) or the 3-dimensional spinel structure of $Li_2O_4$. Extraction of lithium from each of these three oxides gives access to $M^{4+}/M^{3+}$ redox couples located between 4 and 5 V vs. $Li^+/Li$.

Three-dimensional structures using $(XO_4)^{n-}$ polyanions instead of simple oxides have been proposed recently by J. B. Goodenough et al. in U.S. Pat. No. 5,910,382 as viable alternatives to $LiM_xO_y$. oxides. In particular, $LiFePO_4$ and $Li_3Fe_2(PO_4)_3$ were said to be the most promising Fe-containing materials working at attractive potentials of 3.5 V and 2.8 V respectively vs. $Li^+/Li$. Both compounds operate with the $Fe^{3+}/Fe^{2+}$ redox couple and take advantage of the inductive effect of the $XO_4^{n-}$ groups that diminishes the strength of the Fe—O bond compared to a simple oxide.

Padhi et al. in J. Elec. Soc. 144(4) demonstrated the reversible extraction of lithium from olivine $LiFePO_4$ prepared at relatively high temperatures of 800° C. under Ar atmosphere from a solid/solid mixture of $Li_2CO_3$ or $LiOH.H_2O$, $Fe(CH_3COO)_2$ and $NH_4H_2PO_4H_2O$. The products used in the solid/solid reaction are costly, especially $Fe(CH_3COO)_2$, and this process leads to $LiFePO_4$ particles of large average size, typically more than 30 µm. Only 60 to 70% of the theoretical capacity of 170 mAh/g was achieved at a very low charge/discharge rate of around C/80. Less capacity is to be expected at higher current densities of e.g. C/5.

Several authors reported improvements in the effective reversible capacity of $LiFePO_4$. This was attained through various synthesis strategies that involved either the coating of electronic conductive carbon on $LiFePO_4$ particles (N. Ravet et al., Proc. Elec. Soc. Meeting, Hawaï, 1999) or the use of strongly reactive $Fe^{II}$ oxalate as a precursor for obtaining $LiFePO_4$ particles at moderate temperatures (Ri et al. in JP-2000-294238 or Yamada et al. in Elec. Soc. 148(3), A224 (2001)). The $Fe^{II}$ oxalate precursor route described in JP-2000-294238 is a solid/solid reaction that requires extensive grinding/mixing of the $NH_4H_2PO_4$, $FeC_2O_4$ and $Li_2CO_3$ precursors in acetone and evaporation under $N_2$. This step is followed by a thermal treatment at temperatures ranging from 300 to 790° C. The particle size obtained in this case was also around 30 µm.

In the prior art, $Fe^{II}$ is selected as a starting product for the synthesis of $LiFePO_4$. The synthesis is realised under inert (Ar or $N_2$) atmosphere so as to avoid the oxidation of $Fe^{II}$ to $Fe^{III}$. However, $Fe^{II}$ sources either are very expensive, e.g. $Fe^{II}$ acetate, or may lead to the formation of strongly toxic gases, e.g. CO during the thermal decomposition of $Fe^{II}$ oxalate. Moreover, these $Fe^{II}$ precursors are prone to oxidation into $Fe^{III}$ in air and must be handled under inert atmosphere or under a non-aqueous solvent. Also, particle sizes of at least 30 µm were obtained and such course grain sizes lead to kinetic limitations, in particular when high charge/discharge rates are applied at ambient temperatures such as 25° C.

Another problem in the effective use of $LiFePO_4$ as a positive electrode arises from its low electronic conductivity and from the fact that both $LiFePO_4$ and $FePO_4$ are poor ionic conductors. Therefore, a certain amount of electronic conductive powder, such as Acetylene Black, has to be intermixed with the lithium transition-metal phosphate powder. In the case of WP-2000-294238, the $LiFePO_4$/Acetylene Black ratio was 70/25. Such a high content of electrical conducting agent penalises the overall specific capacity of the composite positive electrode.

It is an object of the present invention to overcome at least some of the disadvantages of the above mentioned processes and products. The present invention discloses a new synthesis technique based on the use of components that may be dissolved in water to yield, after decomposition and annealing under inert or reducing atmosphere, $LiMPO_4$ of controlled particle size.

A process for the manufacture of a $LiMPO_4$ powder is disclosed, comprising the steps of
  providing an equimolar aqueous solution of $Li^{1+}$, $M^{n+}$ and $PO_4^{3-}$ prepared by dissolving components which are susceptible to coexist as solutes in an aqueous system and which, upon heating at a temperature below 500° C., decompose to form a pure homogeneous Li and M phosphate precursor,
  evaporating the water from the solution, thereby producing a solid mixture,
  decomposing the solid mixture at a temperature below 500° C. to form a pure homogeneous Li and M phosphate precursor, and
  annealing the precursor at a temperature of less than 800° C., in an inert or reducing atmosphere, thereby forming a $LiMPO_4$ powder, whereby $M^{n+}$ is one or more of $Fe^{2+}$, $Fe^{3+}$, $Co^{2+}$, $Ni^{2+}$ and $Mn^{2+}$, and M is $Fe_xCo_yNi_zMn_w$, with $0 \leq x \leq 1, 0 \leq y \leq 1, 0 \leq z \leq 1, 0 \leq w \leq 1$ and $x+y+z+w=1$. Preferentially, in the step of annealing the precursor, the annealing temperature is less than 600° C.

In another embodiment of the invention, a process is disclosed for the manufacture of a $LiFePO_4$ powder, comprising the steps of
  providing an equimolar aqueous solution of $Li^{1+}$, $Fe^{3+}$ and $PO_4^{3-}$ prepared by dissolving components which are susceptible to coexist as solutes in an aqueous system and which, upon heating at a temperature below 500° C., decompose to form a pure homogeneous Li and Fe phosphate precursor, evaporating the water from the solution, thereby producing a solid mixture, decomposing the solid mixture at a temperature below 500° C. to form a pure homogeneous Li and Fe phosphate precursor, and annealing the precursor Li and Fe phosphate at a temperature of less than 800° C. in a reducing atmosphere, thereby forming a LiFePO$_4$ powder. Preferentially, in the step of annealing the precursor, the annealing temperature is less than 600° C.

In this embodiment the invention allows the use of cheap and abundant Fe$^{III}$ starting products such as Fe(NO$_3$)$_3$.9H$_2$O or any other iron nitrate, to produce LiFePO$_4$. It should be appreciated that the reduction of Fe$^{III}$ to Fe$^{II}$ can be completed by a short annealing step at relatively low temperatures in a reducing atmosphere, thereby ensuring that only limited grain growth occurs. It is believed that the high reactivity of the solid mixture is due to the extreme homogeneity obtained by the process according to the invention. In the solid/solid reactions according to the prior art however, it is difficult to start from Fe$^{III}$ bearing products, because the reduction of Fe$^{III}$ to Fe$^{II}$ necessitates a lengthy annealing step at high temperature (e.g. 24 hrs at 700-800° C.), resulting in coarse particles with poor electrochemical characteristics and possible reduction of Fe$^{II}$ to Fe metal.

The invention also concerns a powder for use in lithium insertion-type electrodes with formula LiMPO$_4$ having an average particle size of less than 1 µm, whereby M is Fe$_x$Co$_y$Ni$_z$Mn$_w$, with $0 \leq x \leq 1, 0 \leq y \leq 1.0 \leq z \leq 1, 0 \leq w \leq 1$; x+z+w>0, and x+y+z+w=1. Such a product can be obtained by controlling the temperature of the annealing step of the decomposed solid mixture. The small particle size allows achieving high reversible capacities at high current densities and at 25° C., which were not previously observed.

The invention further concerns a powder for use in lithium secondary batteries, having the formula LiFePO$_4$, and characterised by a reversible electrode capacity of at least 65% of the theoretical capacity, when used as an active component in a cathode which is cycled between 2.70 and 4.15 V vs. Li$^+$/Li at a discharge rate of C/5 at 25° C.

The invention further concerns a process for the manufacture of a lithium insertion-type electrode comprising the steps of providing a mixture of a lithium metal phosphate powder synthesised according to the invention, and a conductive carbon bearing powder, and milling this mixture during a period of time so as to optimise the reversible electrode capacity of the electrode comprising said mixture.

In particular, the invention concerns the above lithium insertion-type electrode, whereby the lithium metal phosphate powder is LiFePO$_4$, the conductive carbon powder is Acetylene Black or Carbon Super P, the mixing ratio of LiFePO$_4$/carbon is between 75/25 and 85/15, and the milling time is between 15 and 25 minutes.

The present invention also provides a positive electrode material, LiMPO$_4$ (M is Fe$_x$Co$_y$Ni$_z$Mn$_w$, with $0 \leq x \leq 1, 0 \div y \leq 1, 0 \leq z \leq 1, 0 \leq w \leq 1$ and x+y+z+w=1) for use in rechargeable battery systems comprising an electrolyte, a negative electrode and a separator between the two electrodes.

The details of the invention are illustrated in FIGS. 1 to 11.

For the preparation of LiFePO$_4$, an aqueous solution of a 1 M Fe(NO$_3$)$_3$.9H$_2$O is in a first step slowly added under stirring in air to an equal quantity of a 1 M aqueous solution of LiH$_2$PO$_4$ (synthesised from Li$_2$CO$_3$ and H$_3$PO$_4$) at a pH between 3 and 4. En a second step, the water is slowly evaporated in a known way between 80 and 175° C. in air, to produce a very homogeneous precursor mixture containing Li, Fe and P in the stoichiometric proportions of LiFePO$_4$. More concentrated solutions can be used successfully without penalty towards the purity of the powder produced. The homogeneous precursor that contains Fe$^{III}$ is annealed for 5 to 15 hours in a N$_2$/H$_2$ reducing atmosphere with e.g. 10% H$_2$ at a temperature of at least 500° C. to yield a pure crystalline LiFePO$_4$ phase. One or two intermediate grindings can be applied during annealing to allow complete reduction of the Fe$^{III}$ into Fe$^{II}$. Small amounts of Fe$^{III}$, preferably not exceeding 5 mole %, can be tolerated in the final product.

Figure 1:
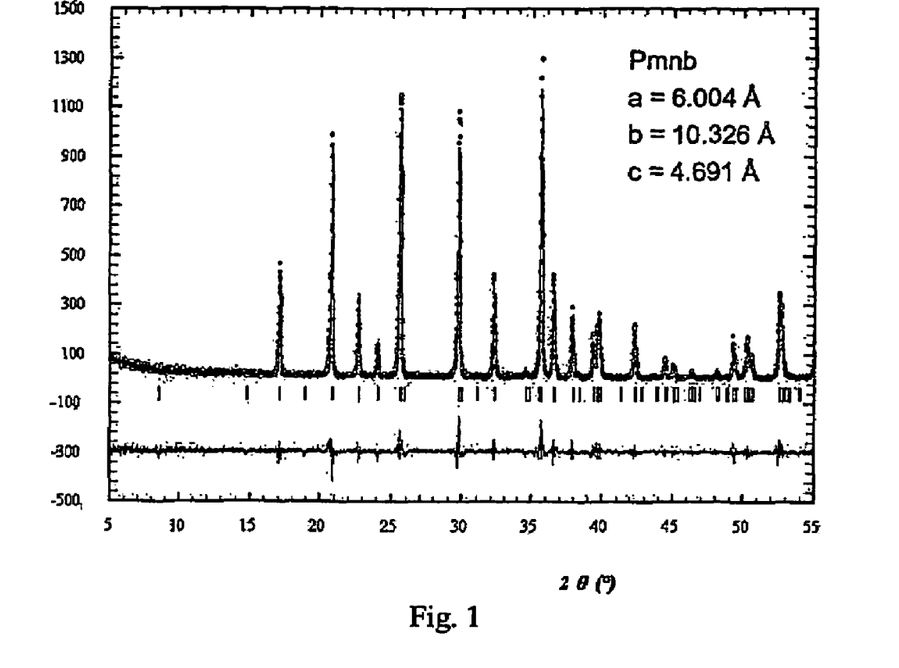
FIG. 1 is the X-ray diffraction pattern of LiFCPO$_4$ according to the invention.

The X-ray diffraction pattern of powder obtained according to above process and annealed at 500° C. is shown in FIG. 1. The diffraction peaks are indexed in the orthorhombic space group Pmnb of the olivine LiFePO$_4$ with unit-cell parameters of a=6.004 Å, b=10.326 Å and c=4.691 Å.

Figure 2:
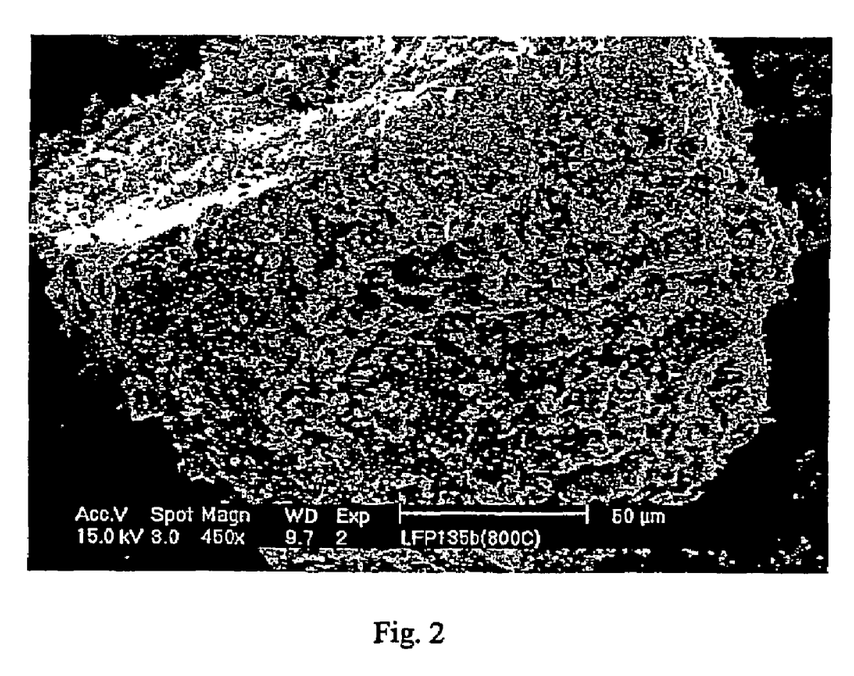
FIG. 2 shows a microphotograph of LiFePO$_4$ obtained by solid/solid reaction at 800° C. according to prior art.
Figure 3:
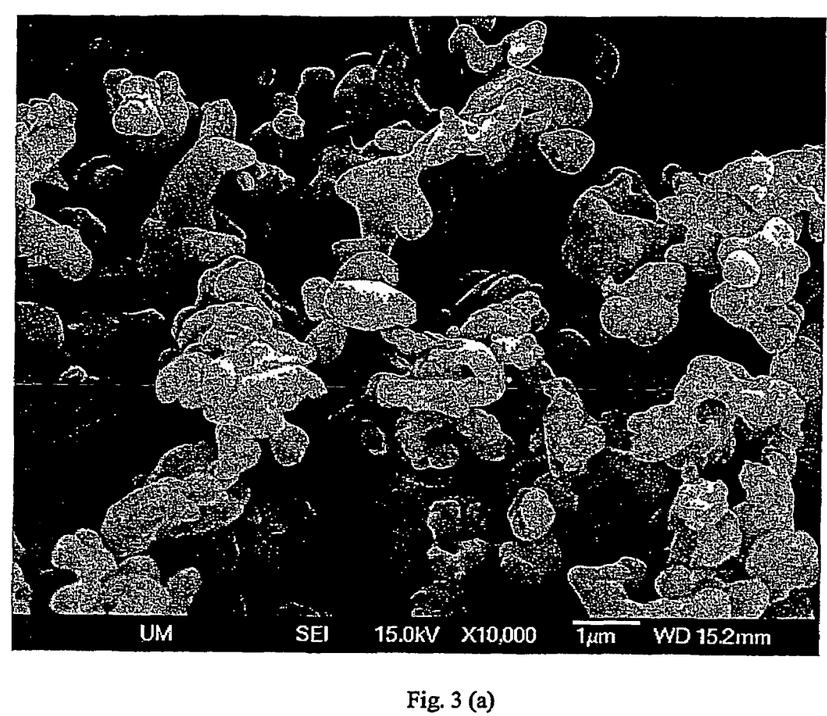
FIGS. 3(a) to (d) shows microphotographs of LiFePO$_4$ according to the invention and annealed at 500, 600, 700 and 800° C. respectively.

FIG. 2 shows the geometry of a particle of LiFePO$_4$ prior art powder obtained at 800° C. through solid state reaction of Fe(CH$_3$COO)$_2$, Li$_2$CO$_3$ and NH$_4$H$_2$PO$_4$ under Ar. The powder is characterised by an average particle size of about 50 µm and by a specific surface of less than 0.5 m$^2$/g.

The LiFePO$_4$ powder obtained by the process of the invention as illustrated in the example above is characterised by a small average particle size of less than 1 µm and a specific surface of 2 to 3 m$^2$/g. Adjustment of the particle size and of the specific surface can be obtained by controlling the annealing temperature between 500 and 800° C. The invention provides thus an easy way of producing LiFePO$_4$ particles of desired sizes and morphologies. As can be seen in FIG. 3(a) to (d), increasing the annealing temperature results in a progressive increase in particle size and consequently in a decrease of the specific surface. Table 1 summarises the results.

TABLE 1

Influence of the annealing temperature on particle size and specific surface area.

| | Annealing temperature (° C.) | | | |
|---|---|---|---|---|
| | 500 | 600 | 700 | 800 |
| Average particle size (μm) | <1 μm | 1 μm | 5 μm | 25 μm |
| Specific surface (m$^2$/g) | 2.84 | 1.06 | 0.54 | 0.30 |

The LiFePO$_4$ powder may be used effectively as a positive electrode in an electrochemical cell. Prior to the cell realisation, an intimate mixture of LiFePO$_4$ together with conducting carbon, preferably Acetylene Black or Carbon Super P, is produced. To this end, LiFePO$_4$ and carbon are introduced in the commonly used weight ratio of 83/17 in a stainless steel vessel, preferably filled with Ar, and ball milled for an adequate time with a milling apparatus such as a SPEX-8000. The LiFePO$_4$ particles are hereby coated with conductive carbon. Adding a binder for cell operation is not mandatory. The electrochemical characteristics of LiFePO$_4$ prepared by the process according to the invention are evaluated in a Swagelok cell configuration with lithium metal pasted on a nickel foil as the negative electrode and LiPF$_6$ in EC/DMC as the electrolyte. The electrochemical characteristics of LiFePO$_4$ as a function of the charge/discharge rate and of the temperature were evaluated.

Figure 4:
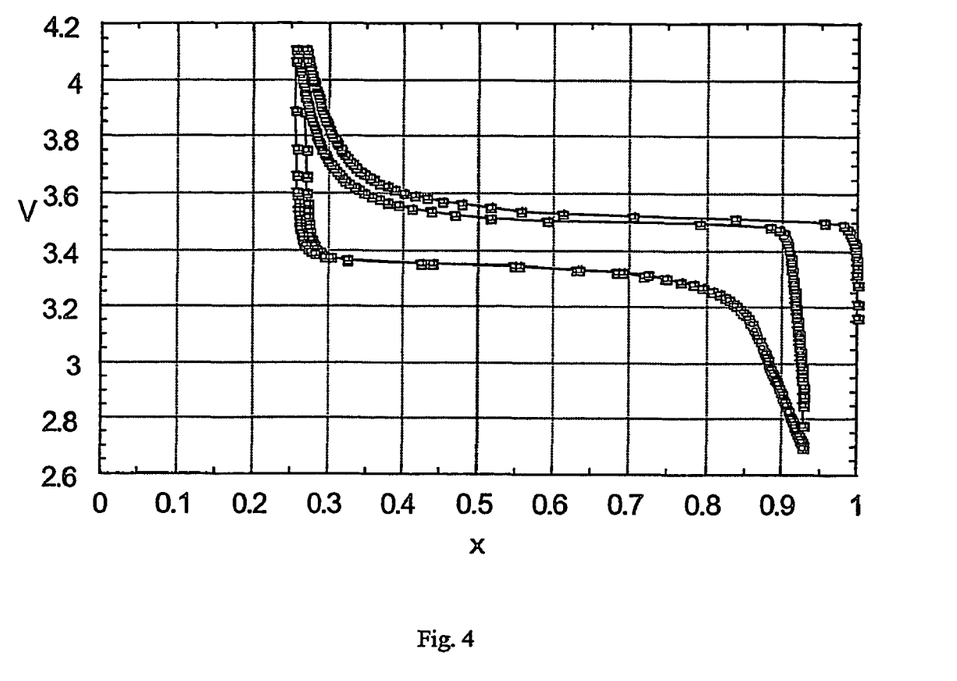
FIG. 4 is the potential (V) vs. x (intercalation in Li$_x$FePO$_4$) behaviour of LiFePO$_4$ according to the invention, annealed at 500° C., mixed with Carbon Super P for 20 minutes and measured at C/5 and 25° C.

LiFePO$_4$ particles were produced at an annealing temperature of 500° C. according to the invention, and milled with Carbon Super P (available from MMM Carbon, Belgium) in a weight ratio of 83/17 for 20 minutes. The obtained powder behaves very well at a high charge/discharge rate of C/5, i.e. one lithium extracted or inserted within 5 hours: as can be seen in FIG. 4, 67% of the theoretical value of 170 mAh/g is observed, which equals to a reversible capacity of 114 mAh/g.

Figure 5:
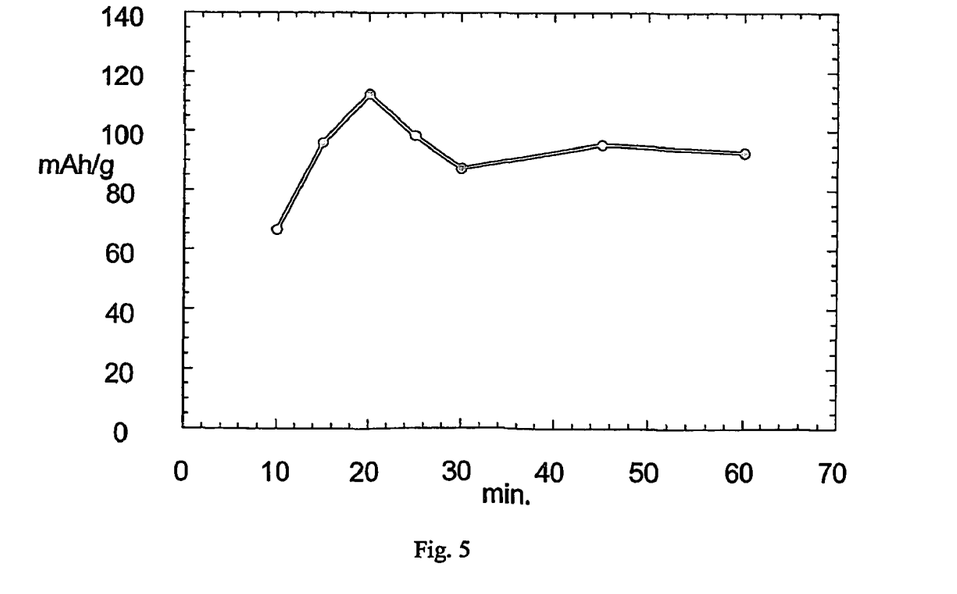
FIG. 5 shows the influence of the milling time (min.) of LiFePO$_4$ powder according to the invention with Carbon Super P on the electrochemical capacity (mAh/g) of the obtained electrode material.

FIG. 5 shows a graph with the relationship between milling time of LiFePO$_4$ particles with Carbon Super P and the reversible capacity obtained. It can be observed that the milling time has a considerable influence and that an optimum milling time can be established, e.g. in the range of between 15 and 25 minutes for the SPEX-8000 milling apparatus.

The positive electrode of the invention may be used in either Li-ion type batteries with carbon at the negative electrode and a non-aqueous liquid electrolyte, or, when operating at 80° C., in polymer-type batteries with metallic lithium at the negative electrode and a POE-type polymer as the electrolyte. When M is Co, Ni or Mn, the use is restricted to non-aqueous liquid electrolyte systems, providing that the electrolyte used is stable at the high operating voltage of more than 4 V of the cell.

Figure 6:
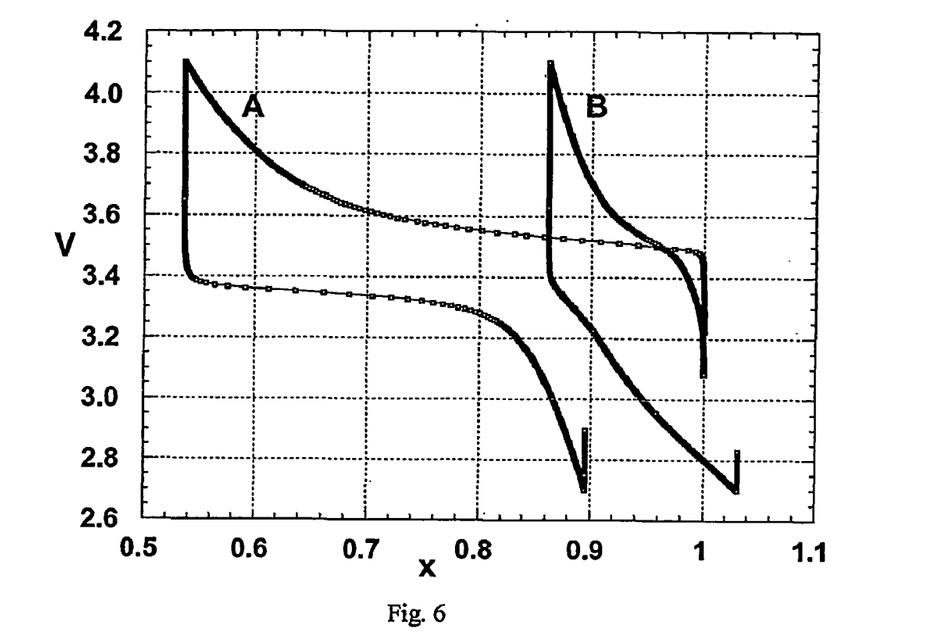
FIG. 6 is a comparison of the potential (V) vs. x (intercalation in Li$_x$FePO$_4$) behaviour of LiFePO$_4$ obtained by solid/solid reaction at 800° C. according to prior art, (A) without and (B) with further grinding.

As an illustration of the improvements achieved by the invention, the particles of a prior art LiFePO$_4$ powder as shown in FIG. 2, i.e. obtained at 800° C. from a solid state reaction under Ar of Fe(CH$_3$COO)$_2$, Li$_2$CO$_3$ and NH$_4$H$_2$PO$_4$, were mixed with Carbon Super P in a weight ratio of 83/17 and tested in an electrochemical cell built in the Swagelok configuration. The positive electrode composite was deposited directly on the aluminium current collector. The electrochemical response of the powder is given in FIG. 6(A). The characteristic voltage curves as a function of x in Li$_x$FePO$_4$ were obtained at equivalent charge/discharge rate of C/5 and 25° C. As can be seen, during charge/discharge cycling less than 40% of the theoretical capacity is reached.

Figure 7:
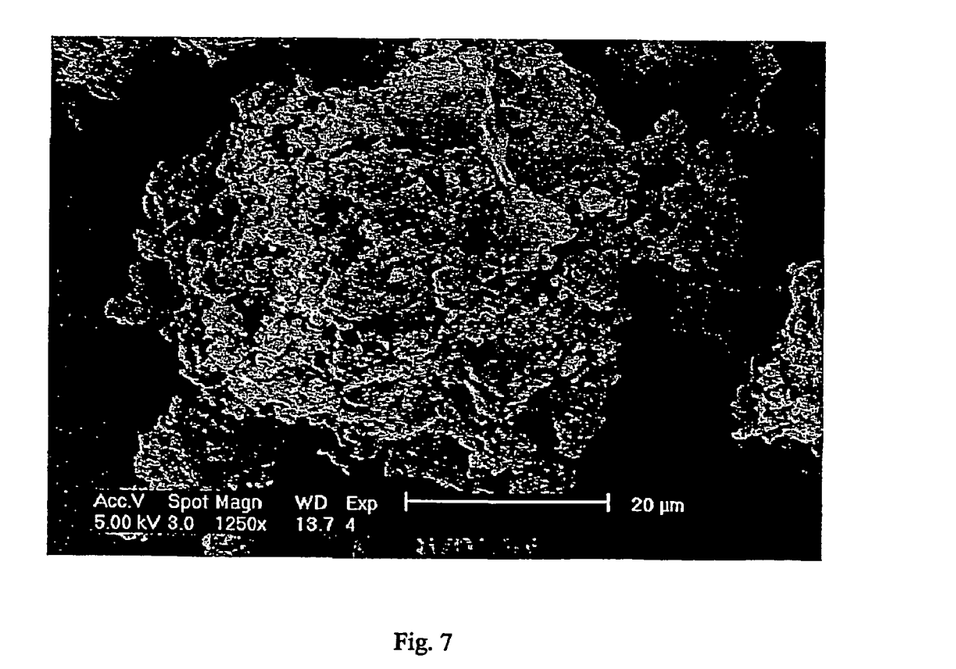
FIG. 7 shows a microphotograph of the further ground powder used for obtaining the results shown in FIG. 6(B).

It is essential to realise that further grinding of the particles of a prior art LiFePO$_4$ powder does not lead to powders obtainable by the low-temperature synthesis of the invention which are characterised by small particles. Indeed, extensive grinding of the prior art LiFePO$_4$ particles did not result in efficient comminution This can be seen by comparing FIG. 2, showing a typical prior art LiFePO$_4$ particle before further grinding, and FIG. 7, showing a typical prior art LiFePO$_4$ particle after 90 minutes of grinding and 15 minutes of milling with carbon using a SPEX-8000 milling apparatus.

Moreover, amorphisation of the powder, and thus loss of the electrochemical activity of the olivine LiFePO$_4$, occurs during grinding: FIG. 6(B) indeed shows that the relative capacity degrades from less than 40% before grinding to 15% after grinding. Note that in this experiment, the milling time with carbon was also observed to be a critical parameter. The reported capacities correspond to those obtained after optimal milling.

Figure 8:
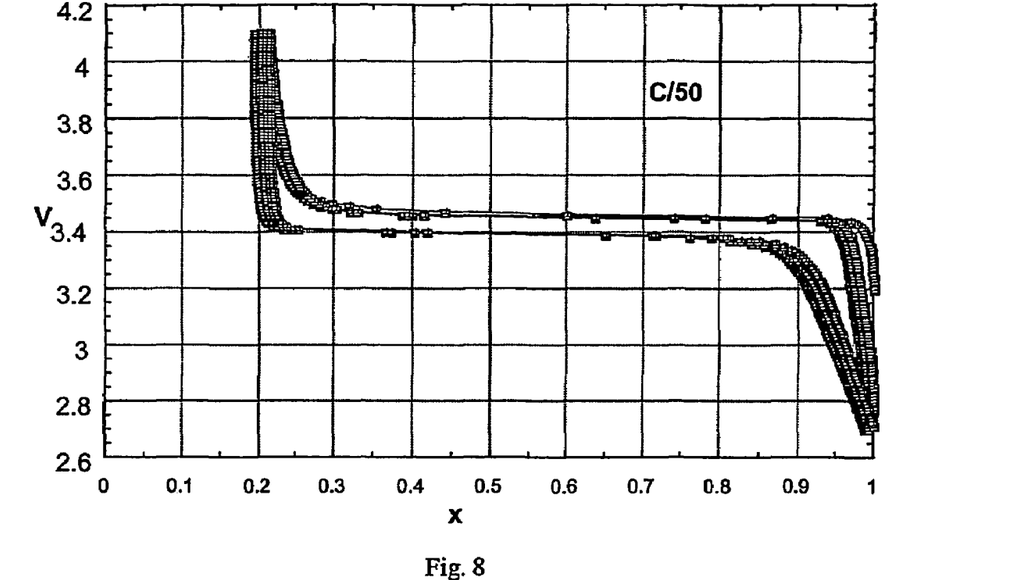
FIG. 8 is the potential (V) vs. x (intercalation in Li$_x$FePO$_4$) behaviour of LiFePO$_4$ according to the invention, annealed at 500° C. and measured at C/50 and 25° C.
Figure 9:
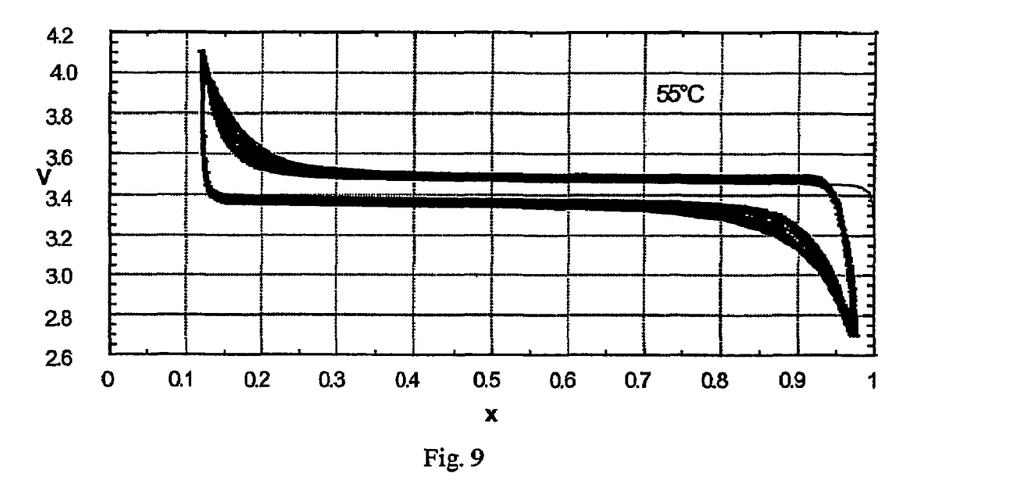
FIG. 9 is the potential (V) vs. x (intercalation in Li$_x$FePO$_4$) behaviour of LiFePO$_4$ according to the invention, annealed at 500° C. and measured at C/5 and 55° C.
Figure 10:
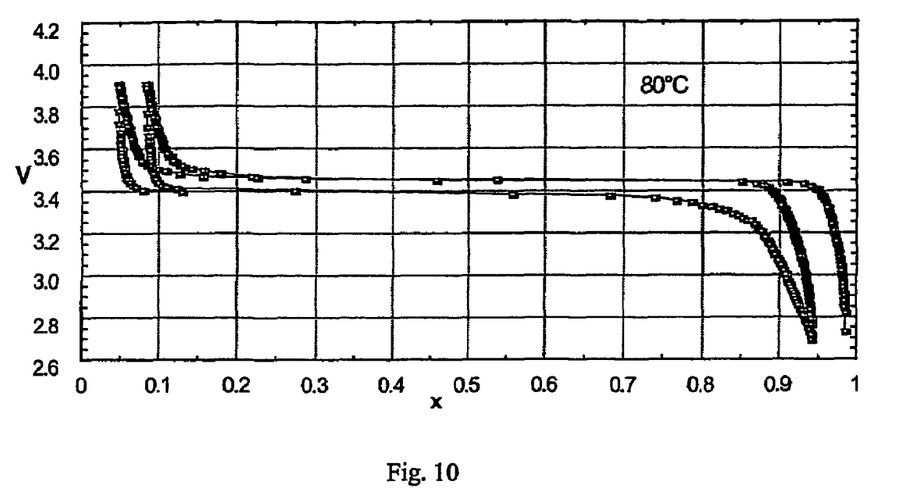
FIG. 10 is the potential (V) vs. x (intercalation in Li$_x$FePO$_4$) behaviour of LiFePO$_4$ according to the invention, annealed at 500° C. and measured at C/5 and 80° C.

For the composite electrode prepared with LiFePO$_4$ synthesised according to the invention at an annealing temperature of 500° C. and mixed in a 83/17 weight ratio with Carbon Super P, the effects of the cycling regime and of the temperature on the observed charge and discharge behaviour are summarised in FIGS. 8 to 10. As can be seen in FIG. 8, the slow kinetics of the front-type reaction between LiFePO$_4$ and FePO$_4$ are less penalising at a slower charge/discharge rate, as a reversible electrode capacity of 80% of the theoretical capacity for a charge/discharge rate of C/50 is observed. Also, as illustrated in FIGS. 9 and 10, the kinetics improve with increasing operating temperature of the electrochemical cell. A reversible capacity as high as 90% of the theoretical capacity is reached at 80° C. Moreover, it is remarkable to observe the very small polarization of the electrochemical cell under these conditions.

Figure 11:
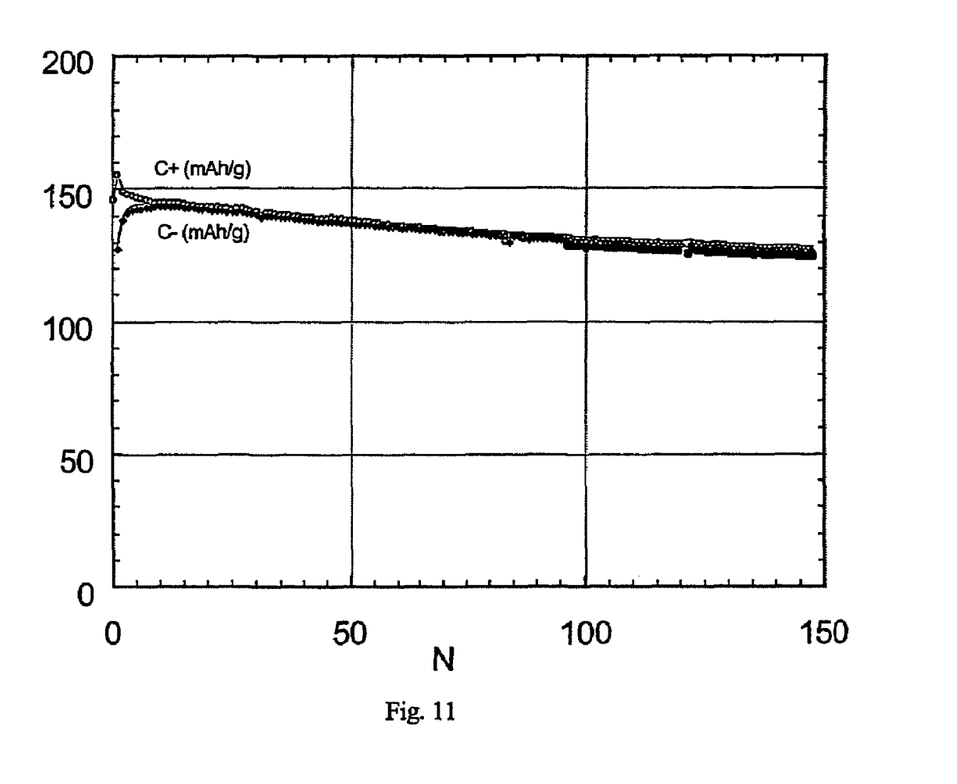
FIG. 11 shows the influence of the number of cycles (N) on an electrode containing LiFePO$_4$ powder according to the invention on the electrochemical charge (C+) and discharge (C−) capacity (mAh/g) of the obtained electrode material.

Finally, tests have shown the high stability of LiFePO$_4$, even when cycled at a relatively high temperature of 55° C., as is demonstrated in FIG. 11. The cycling was performed at charge and discharge rates of C/10.

LiCoPO$_4$ can also be synthesised according to the invented process. To this end, an aqueous solution of a 1 M Co(NO$_3$)$_2$.6H$_2$O is in a first step slowly added under stirring in air to an equal quantity of a 1 M aqueous solution of LiH$_2$PO$_4$ at a pH between 3 and 4. In a second step, the water is slowly evaporated in a known way at 95° C. in air, to produce a very homogeneous precursor mixture containing Li, Co and P in the stoichiometric proportions of LiCoPO$_4$. The homogeneous precursor that contains Li, Co$^{II}$ and P is annealed for 10 hours in an inert N$_2$ atmosphere at a temperature of 500° C. to yield a pure crystalline LiCoPO$_4$ phase. One intermediate grinding is applied during annealing in order to enhance the homogeneity of the final product.

What is claimed is:

1. A process for the manufacture of a LiMPO$_4$ powder, comprising the steps of:
   providing an equimolar aqueous solution of Li$^{1+}$, M$^{n+}$, and PO$_4^{3-}$ prepared by dissolving components which are susceptible to coexist as solutes in an aqueous system and which, upon heating at a temperature below 500° C., decompose to form a pure homogeneous Li and M phosphate precursor;

evaporating water from the solution, thereby producing a solid mixture;

decomposing the solid mixture at a temperature below 500° C. to form a pure homogeneous Li and M phosphate precursor; and annealing the precursor at a temperature of less than 800° C. in an inert or reducing atmosphere, thereby forming a LiMPO$_4$ powder of olivine structure;

wherein $M^{n+}$ is one or more of $Fe^{2+}$, $Fe^{3+}$, $Co^{2+}$, $Ni^{2+}$, and $Mn^{2+}$, and M is $Fe_xCo_yNi_zMn_w$, with $0 \leq x \leq 1, 0 \leq y \leq 1, 0 \leq z \leq 1, 0 \leq w \leq 1$, and $x+y+z+w=1$.

2. The process according to claim 1, wherein in the step of annealing the precursor, the annealing temperature is less than 600° C.

3. A process for the manufacture of a LiFePO$_4$ powder, comprising the steps of:

providing an equimolar aqueous solution of $Li^{1+}$, $Fe^{3+}$, and $PO_4^{3-}$ prepared by dissolving components which are susceptible to coexist as solutes in an aqueous system and which, upon heating at a temperature below 500° C., decompose to form a pure homogeneous Li and Fe phosphate precursor;

evaporating water from the solution, thereby producing a solid mixture;

decomposing the solid mixture at a temperature below 500° C. to form a pure homogeneous Li and Fe phosphate precursor; and annealing the precursor at a temperature of less than 800° C. in a reducing atmosphere, thereby forming a LiFePO$_4$ powder of olivine structure.

4. The process according to claim 3, wherein in the step of annealing the precursor, the annealing temperature is less than 600° C.

5. The process according to claims 3, wherein the $Fe^{3+}$ bearing component is iron nitrate.

6. A powder for use in lithium insertion-type electrodes prepared by a process comprising the steps of:

providing an equimolar aqueous solution of $Li^{1+}$, $Mn^{n+}$, and $PO_4^{3-}$ prepared by dissolving components which are susceptible to coexist as solutes in an aqueous system and which, upon heating at a temperature below 500° C., decompose to form a pure homogeneous Li and M phosphate precursor;

evaporating water from the solution, thereby producing a solid mixture;

decomposing the solid mixture at a temperature below 500° C. to form a pure homogeneous Li and M phosphate precursor; and annealing the precursor at a temperature of less than 600° C. in an inert or reducing atmosphere, thereby forming a LiMPO$_4$ powder of olivine structure and having an average particle size of less than 1 μm;

wherein $M^{n+}$ is one or more of $Fe^{2+}$, $Fe^{3+}$, $Co^{2+}$, $Ni^{2+}$, and $Mn^{2+}$, and M is $Fe_xCo_yNi_zMn_w$, with $0 \leq x \leq 1, 0 \leq y \leq 1, 0 \leq z \leq 1, 0 \leq w \leq 1$, and $x+y+z+w=1$.

7. The powder according to claim 6, wherein $M^{n+}$ is $Fe^{3+}$, M is $Fe^{3+}$, M is Fe and the annealing occurs in a reducing atmosphere.

8. A battery comprising a lithium insertion electrode including a powder prepared by a process comprising the steps of:

providing an equimolar aqueous solution of $Li^{1+}$, $M^{n+}$, and $PO_4^{3-}$ prepared by dissolving components which are susceptible to coexist as solutes in an aqueous system and which, upon heating at a temperature below 500° C., decompose to form a pure homogeneous Li and M phosphate precursor;

evaporating water from the solution, thereby producing a solid mixture;

decomposing the solid mixture at a temperature below 500° C. to form a pure homogeneous Li and M phosphate precursor; and annealing the precursor at a temperature of less than 600° C. in an inert or reducing atmosphere, thereby forming a LiMPO$_4$ powder of olivine structure and having an average particle size of less than 1 μm;

wherein $M^{n+}$ is one or more of $Fe^{2+}$, $Fe^{3+}$, $Co^{2+}$, $Ni^{2+}$, and $Mn^{2+}$, and M is $Fe_xCo_yNi_zMn_w$, with $0 \leq x \leq 1, 0 \leq y \leq 1, 0 \leq z \leq 1, 0 \leq w \leq 1$, and $x+y+z+w=1$.

9. The battery according to claim 8, wherein $x+z+w>0$.

10. The battery according to claim 9, wherein M is Fe, the powder having a reversible electrode capacity of at least 65% of a theoretical capacity when used as an active component in a cathode that is cycled between 2.70 and 4.15 V vs. $Li^+/Li$ at a discharge rate of C/5 at 25° C.

11. The battery according to claim 8, wherein $M^{n+}$ is $Fe^{3+}$, M is Fe, and the annealing occurs in a reducing atmosphere.

* * * * *

UNITED STATES PATENT AND TRADEMARK OFFICE
CERTIFICATE OF CORRECTION

| | |
|---|---|
| PATENT NO. | : 7,371,482 B2 |
| APPLICATION NO. | : 10/719134 |
| DATED | : May 13, 2008 |
| INVENTOR(S) | : Calin Wurm et al. |

It is certified that error appears in the above-identified patent and that said Letters Patent is hereby corrected as shown below:

IN THE CLAIMS

Column 7, line 38, "insertion-type" should read --insertion--.

Column 8, line 13, "M is Fe3+" should be deleted.

Signed and Sealed this

Fifth Day of May, 2009

JOHN DOLL
*Acting Director of the United States Patent and Trademark Office*